(12) United States Patent
Maslov et al.

(10) Patent No.: US 7,303,031 B2
(45) Date of Patent: Dec. 4, 2007

(54) ANTHROPOMORPHIC ROBOT

(75) Inventors: Leonid Maslov, Gyeonggi-do (KR); Yonng Son, Gyeonggi-do (KR); Joo-young Kwak, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/092,747

(22) Filed: Mar. 30, 2005

(65) Prior Publication Data

US 2005/0230159 A1    Oct. 20, 2005

(30) Foreign Application Priority Data

Mar. 31, 2004  (KR) ...................... 10-2004-0022036

(51) Int. Cl.
*B62D 51/06* (2006.01)
(52) U.S. Cl. .................. 180/8.1; 180/8.2; 180/8.5; 180/8.6; 901/1
(58) Field of Classification Search ............... 180/8.1, 180/8.2, 8.5, 8.6; 901/1
See application file for complete search history.

(56) References Cited

U.S. PATENT DOCUMENTS

| | | | |
|---|---|---|---|
| 5,176,560 A | | 1/1993 | Wetherell et al. |
| 5,402,050 A | * | 3/1995 | Ozawa .................. 318/568.12 |
| 5,455,497 A | * | 10/1995 | Hirose et al. .......... 318/568.12 |
| 6,967,456 B2 | * | 11/2005 | Takenaka et al. ....... 318/568.12 |
| 2004/0238240 A1 | * | 12/2004 | Hirose et al. ................ 180/8.1 |
| 2005/0011685 A1 | * | 1/2005 | Takenaka et al. ............ 180/8.6 |
| 2005/0126833 A1 | * | 6/2005 | Takenaka et al. ............ 180/8.1 |
| 2006/0060394 A1 | * | 3/2006 | Hayakawa et al. .......... 180/8.5 |

FOREIGN PATENT DOCUMENTS

CN          2246054 Y          1/1997

OTHER PUBLICATIONS

Official Action issued by the Chinese Patent Office in corresponding Chinese Patent Application No. 2005100697276 on Dec. 8, 2006, and English translation thereof.

* cited by examiner

*Primary Examiner*—Lesley D. Morris
*Assistant Examiner*—Marlon Arce-Diaz
(74) *Attorney, Agent, or Firm*—Buchanan Ingersoll & Rooney PC (57) ABSTRACT

Provided is an anthropomorphic robot having two legs and which is capable of walking upright. Each of the two legs has a foot which comprises an upper plate on which an ankle joint is installed and which is similar to a foot of a human, and a lower plate attached to a lower surface of the upper plate and having a plurality of contact portions which contact a ground and which are separated from one another.

13 Claims, 12 Drawing Sheets

ANTHROPOMORPHIC ROBOT

BACKGROUND OF THE INVENTION

Priority is claimed to Korean Patent Application No. 10-2004-0022036, filed on Mar. 31, 2004, in the Korean Intellectual Property Office, the disclosure of which is incorporated herein in its entirety by reference.

1. Field of the Invention

The present invention relates to a robot, and more particularly, to an anthropomorphic robot having two legs and capable of walking upright.

2. Description of the Related Art

In robots, one of important conditions required for a foot of a robot is that it provide an effective interaction between the ground and the foot of the robot. When the heel of a foot of the robot touches the ground, a shock is generated and the shock is transferred to the body of the robot through ankle of the foot of the robot. Such a shock may break dynamic equilibrium of the robot so that walking becomes unstable for the robot. Also, the shock generated when the heel of a foot of the robot touches the ground may cause vibration to the foot of the robot. The vibration is transferred to the body of the robot, which makes control of the robot difficult.

Another problem relating to the walking of the robot are that small obstacles exist on the ground in an activity area of an actual environment, which cannot be recognized by a vision system of the robot and is not included in the control of the robot, is not so flat as a 2 dimensional plane.

Accordingly, due to the obstacle and uneven activity area, the foot of the robot steps on a position different from that originally calculated with no consideration of them. As a result, the walking motion of the robot becomes unstable and the movement is not smooth.

A widely known anthropomorphic robot, for example, P2, HRP, or WABIAN, has a foot formed of two metal parts connected by an elastic adapter. A shock absorption mechanism for the foot of the anthropomorphic robot consists of four rubber bushes inserted in guides. When a force is transferred from a base plate to the four rubber bushes, the four rubber bushes are elastically deformed in a vertical direction. Further, the four rubber bushes mechanically act as a low pass filter so that vibration can be prevented during a compliance control process with respect to legs of the robot.

However, since the above conventional foot of the robot has a constant stiffness, it is very inconvenient to step on the ground or off from the ground. Moreover, the foot of the robot is very sensitive to small obstacles existing on the ground or a small uneven area. In other words, a capacity of the robot reacting to the small obstacles existing on the ground or small uneven area is deteriorated.

SUMMARY OF THE INVENTION

To solve the above and/or other problems, the present invention provides a foot of an anthropomorphic robot, which can make walking of a robot smoother while securing static and dynamic equilibrium and improve stability of the robot by enhancing the static and dynamic equilibrium of the robot.

According to an aspect of the present invention, the present invention provides an anthropomorphic robot having two legs which is capable of walking upright, wherein each of the two legs has a foot comprising an upper plate on which an ankle joint is installed and which is similar to a foot of a human, and a lower plate attached to a lower surface of the upper plate and having a plurality of contact portions which contact a ground and which are separated from one another.

The upper plate may be a metal plate or a non-metal plate having a stiffness property.

The lower plate may comprise an elastic plate having a first elasticity and whose entire upper surface contacts the lower surface of the upper plate and first through third contact portions having a second elasticity and protruding from a lower surface of the elastic plate to contact the ground.

The first and second elasticity may be identical to each other or different from each other.

The elastic plate and the first through third contact portions may be a single body.

According to another aspect of the present invention, the lower plate may comprise an elastic plate whose entire upper surface contacts the lower surface of the upper plate and first through third contact portions having a predetermined elasticity and protruding from a lower surface of the elastic plate to contact the ground. The elastic plate may be formed of a plurality of independent bodies. The elasticity of some of the independent bodies may be different from the remaining bodies.

The elastic plate may comprise a first piece having a lower surface to which the first contact portion is attached, a second piece having a lower surface to which the second contact portion is attached, a fourth piece having a lower surface to which the third contact portion is attached, and a third piece provided between the first, second, and fourth pieces.

The first contact portion and the first piece, the second contact portion and the second piece, and the third contact portion and the fourth piece may be all single bodies.

The elasticity of the first, second, and fourth pieces may be different from that of the third piece.

According to yet another aspect of the present invention, the lower plate may comprise a first piece having an upper surface attached to the lower surface of the upper plate and a lower surface contacting the ground, a second piece separated from the first piece and having an upper surface attached to the lower surface of the upper plate and a lower surface contacting the ground, and a third piece separated from the first and second pieces and having an upper surface attached to the lower surface of the upper plate and a lower surface contacting the ground. The first through third pieces may be formed of a plurality of material layers having different elasticity, which are sequentially deposited.

Also, the first piece may comprise a first contact portion contacting the ground and a first attachment portion attached to the lower surface of the upper plate, the second piece comprises a second contact portion contacting the ground and a second attachment portion attached to the lower surface of the upper plate, and the third piece comprises a third contact portion contacting the ground and a third attachment portion attached to the lower surface of the upper plate.

Also, the first through third attachment portions may be provided only in a predetermined area of the first through third contact portions, respectively, so that space exists between the upper plate and the first through third contact portions.

The elastic plate may be a thermoplastic rubber plate.

The first through third attachment portions may be a thermoplastic rubber plates.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
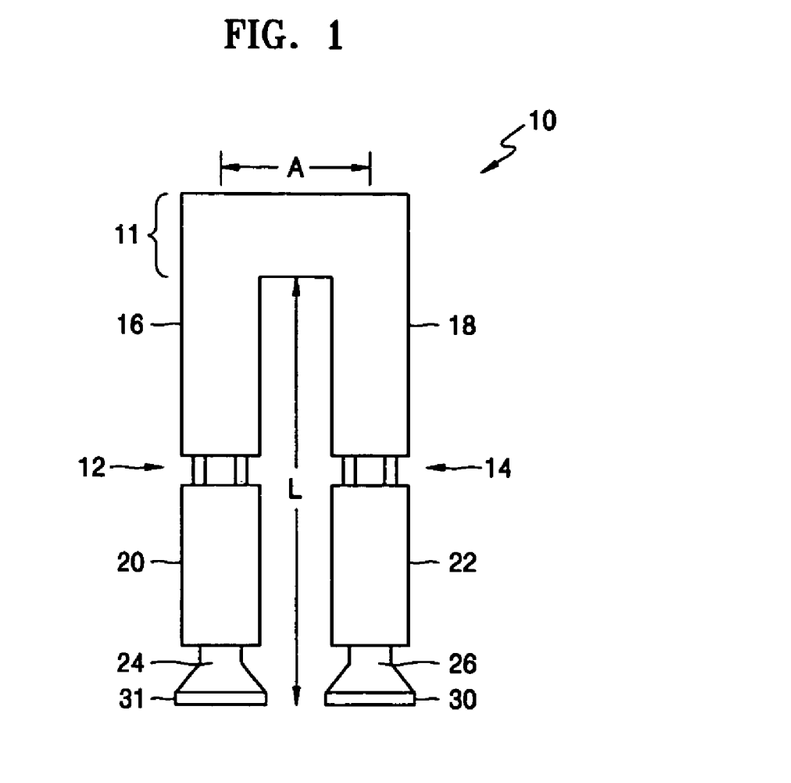
FIG. 1 is a front view illustrating a lower body of an anthropomorphic robot capable of walking upright according to an embodiment of the present invention.

Referring to FIG. 1, a lower body 10 of an anthropomorphic robot according to a first embodiment of the present invention includes two legs 12 and 14 and a waist portion 11. The two legs 12 and 14 each include thighs 16 and 18, shanks 20 and 22, ankles 24 and 26, and foots 30 and 31. Since the legs 12 and 14 and the feet 30 and 31 are identically and symmetrically formed, only one side leg or foot will be described below.

Figure 2:
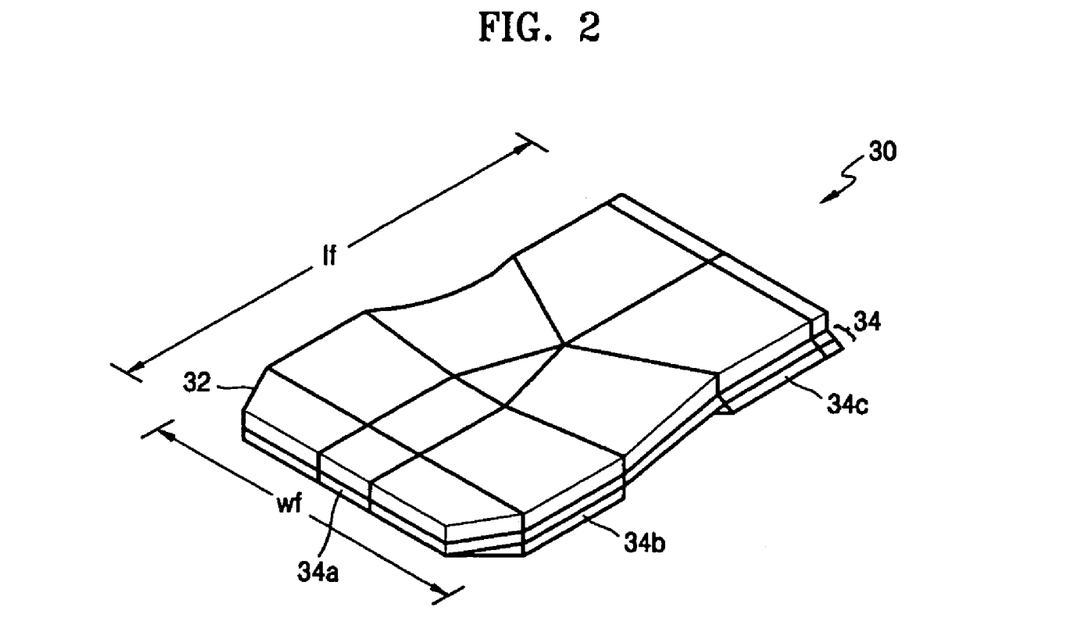
FIG. 2 is a perspective view of a foot of the robot show in FIG. 1.

Referring to FIG. 2, the foot 30 of the anthropomorphic robot according to the first embodiment of the present invention includes an upper plate 32 and a lower plate 34. The upper plate 32 is attached on the lower plate 34. A 6-axis force sensor is provided on the upper plate 32. The ankle 26 of the robot is fixed on the upper plate 32. The upper plate 32 may be formed of the same material as that forming a frame of the robot or a different material.

For example, the upper plate 32 may be a metal plate such as an aluminum alloy plate or a non-metal plate having a stiff property, for example, a plastic plate. The lower plate 34 includes a special thermoplastic rubber plate, which reduces shock. The rubber plate works as a shock-absorbing member that absorbs a shock generated when the foot 30 of the robot steps on the ground. When the elastic module of thermoplastic rubber forming the lower plate 34 is about 2 MPa, for example, a mean stiffness of the foot 30 of the robot may be about 5,000 N/mm.

Figure 4:
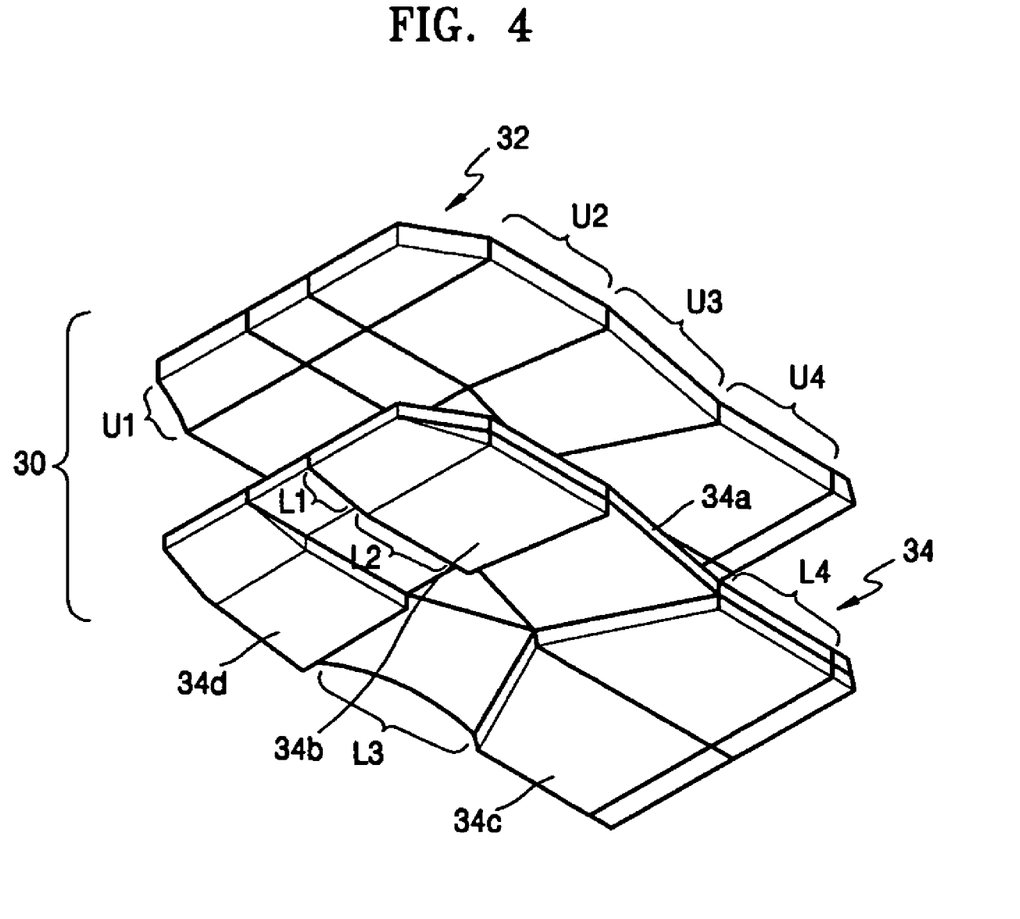
FIG. 4 is an exploded perspective view of the foot of the robot shown in FIG. 2 when viewed from the bottom.

The lower plate 34 includes a rubber plate 34a having a predetermined thickness and attached to a bottom surface of the upper plate 32 and first through third contact portions 34b, 34c, and 34d provided on a bottom surface of the rubber plate 34a to actually contact the ground (please refer to FIG. 4). The first through third contact portions 34b, 34c, and 34d protrude downward to a predetermined thickness from the bottom surface of the rubber plate 34a as shown in FIG. 4. Thus, space is present between the first through third contact portions 34b, 34c, and 34d and stability of the robot is further improved by the space. That is, since the space is present between the first through third contact portions 34b, 34c, and 34d, even when the robot that walks on a road meets a small obstacle or a small uneven area, the stability of the robot can be secured.

Here, although the rubber plate 34a and the first through third contact portions 34b, 34c, and 34d are described to be independent from one another and can be coupled as independent elements, the lower plate 34 may be formed into a single body. That is, the rubber plate 34a and the first through third contact portions 34b, 34c, and 34d may be manufactured into a single body.

The upper plate 32 and the rubber plate 34a of the lower plate 34 can be divided into a plurality of areas corresponding to the foot of a human.

Figure 3:
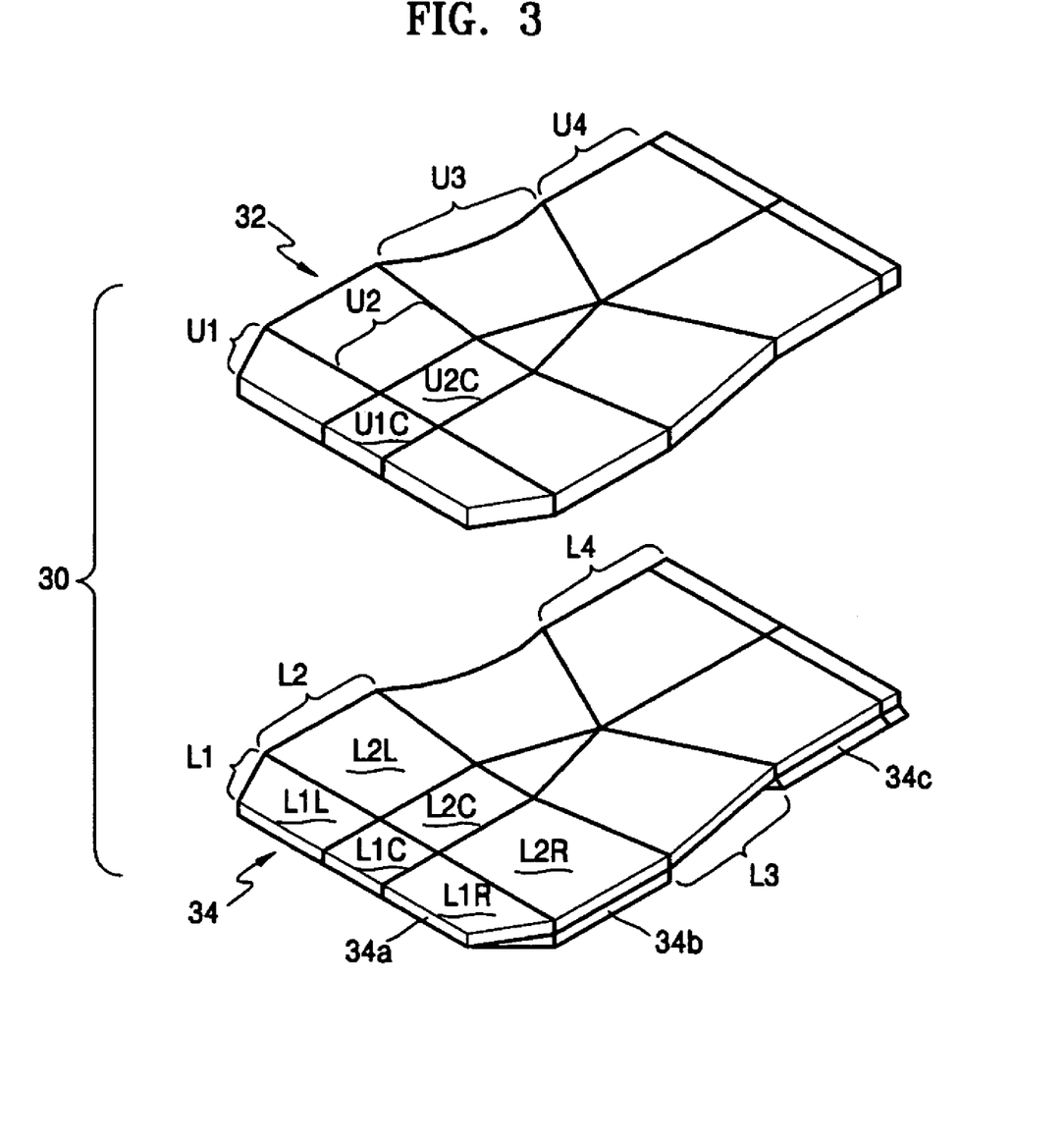
FIG. 3 is an exploded perspective view of the foot of the robot shown in FIG. 2 when viewed from the top.

Referring to FIG. 3, first and second portions U1 and U2 of the upper plate 32 and first and second portions L1 and L2 of the rubber plate 34a of the lower plate 34 correspond to a front portion of the foot of a human including toes. A fourth portion U4 of the upper plate 32 and a fourth portion L4 of the rubber plate 34a of the lower plate 34 correspond to a heel of a human foot. A third portion U3 of the upper plate 34 and a third portion L3 of the rubber plate 34a of the lower plate 34 correspond to an arched section between the front portion and the heel of a human foot. The first portion L1 of the rubber plate 34a of the lower plate 34 consists of a left area L1L, a center area L1C, and a right area L1R. The second portion L2 consists of a left area L2L, a center area L2C, and a right area L2R. The center area L1C of the first portion L1 corresponds to a center area U1C of the first portion U1 of the upper plate 32. The center area L2C of the second portion L2 corresponds to a center area U2C of the second portion U2 of the upper plate 32. The first contact portion 34b of the lower plate 34 is provided on a lower surface of the right area L1R of the first portion L1 and the right area L2R of the second portion L2. The second contact portion 34c of the lower plate 34 is provided on a lower surface of the fourth portion L4. The third contact portion 34d of the lower plate 34 is provided on a lower surface of the left area L1L of the first portion L1 and the left area L2L of the second portion L2. The first and third contact portions 34b and 34d are separated from each other as much as the center area L1C of the first portion L1 or the center area L2C of the second area L2. Also, the first and third contact portions 34b and 34d and the second contact portion 34c are separated from each other as much as the third portion L3. A center portion of the second contact portion 34c is rather tapered toward the front portion of the rubber plate 34a.

Figure 5:
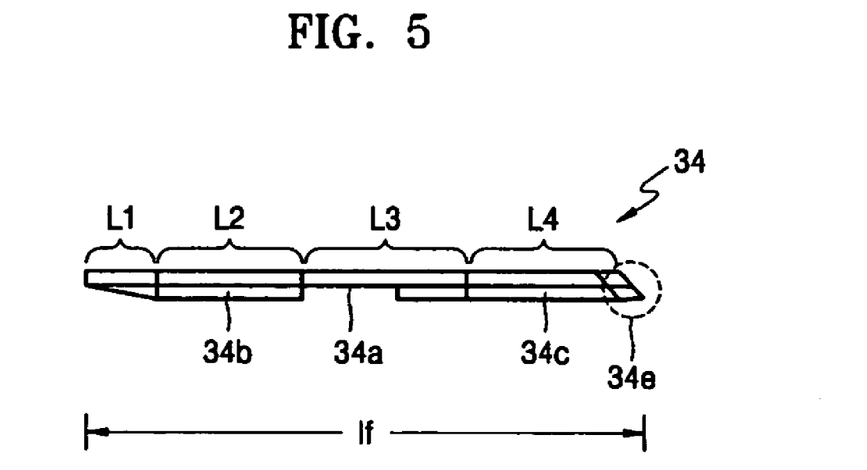
FIG. 5 is a side view of a lower plate that is one of elements constituting the foot of the robot shown in FIG. 3.

FIG. 5 shows the side surface of the foot of the robot, in particular, the side surface of the lower plate 34, according to the first embodiment of the present invention. Referring to FIG. 5, a rear portion 34e of the lower plate 34 corresponding to the heel of a human foot, that is, the rear portion of the second contact portion 34c, is processed to be round. The front portions of the first and third contact portions 34b and 34c corresponding to the toes are processed to be round. By making the rear portion of the second contact portion 34c and the front portion of the first and third contact portions 34b and 34d round, when the foot 30 of the robot steps on the ground, a shock to the foot 30 of the robot can be reduced and the foot 30 of the robot can smoothly land on the ground.

The upper plate 32 of the foot 30 of the robot is about 230 mm long (lf) and 150 mm wide (wf) and the lower plate 34 of the foot 30 of the robot has a length of 235 mm, a width of 150 mm, and a thickness of 12 mm, as examples. The length lf, the width wf or the thickness may vary according to the weight or size of the robot and the shape of the foot 30 and, especially, the size of the foot 30 may be different when the robot stands still or moves. For example, as described above, when the front portions of the first and third contact portions 34b and 34d of the lower plate 34 and the rear portion of the second contact portion 34c are processed to be round, the rounded portion of the second contact portion 34c may be used as portion of the foot 30 of the robot during robot moves. Therefore, the size of the foot 30 of the robot can be changed from a size of 195 mm×150 mm (standing) to a size of 235 mm×150 mm (moving). The increase in the size of the foot 30 of the robot when the robot moves rather than stands still signifies that a contact area between the foot 30 of the robot and the ground increases when the robot moves. As a result, the foot 30 of the robot, that is, the robot, can be prevented from being undesirably moved and rotated around a contact area. The ankle 26 of the robot and the foot 30 of the robot may be combined each other such that the center of the ankle 26 of the robot is located at a position separated 60 mm from the rear end of the foot 30 of the robot. The combined position between the ankle 26 of the robot and the foot 30 of the robot may be more or less than 60 mm according to the size of the foot 30 of the robot.

Equation 1 shows a ratio C1 (hereinafter, referred to as the first ratio) of the length lf of the foot 30 of the robot with respect to a length L of the leg 14 of the robot according to the first embodiment of the present invention. Equation 2 shows a ratio C2 (hereinafter, referred to as the second ratio) of the width wf of the foot 30 of the robot with respect to a distance A between two points of a waist where two legs are connected. Equation 3 shows a ratio C3 (hereinafter, referred to as the third ratio) of the width wf of the foot 30 of the robot with respect to the length lf of the foot 30 of the robot.

$$C1 = (lf/L) \times 100\% \qquad \text{[Equation 1]}$$

$$C2 = (wf/A) \times 100\% \qquad \text{[Equation 2]}$$

$$C3 = (wf/lf) \times 100\% \qquad \text{[Equation 3]}$$

For the foot 30 of the robot according to the first embodiment of the present invention, the first through third ratios C1, C2, and C3 are 0.36-0.4, 0.67, and 0.64-0.77, respectively.

SECOND EMBODIMENT

Among the elements constituting a foot of a robot according to a second embodiment of the present invention (hereinafter, referred to as the second robot foot), the same reference numerals (signs) used in the description of the foot of the robot according to the first embodiment of the present invention (hereinafter, referred to as the first robot foot) are used for the same elements as those constituting the first robot foot. The upper plate of the second robot foot is the same as that of the first robot foot. Thus, the following description will be limited to the lower plate of the second robot foot. The same assumption will be applied to third and fourth embodiments that will be described later.

Figure 6:
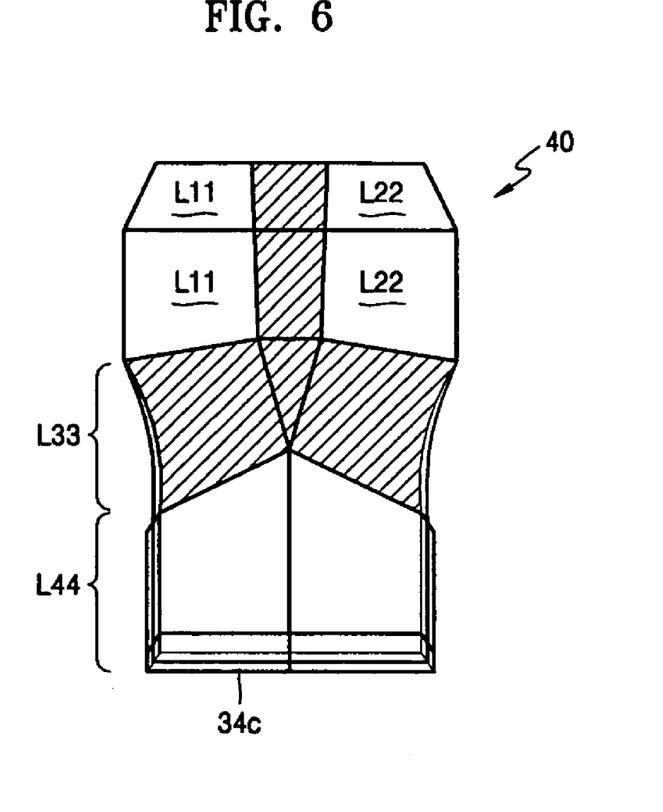
FIG. 6 is a plan view of a lower plate of a foot of a robot according to a second embodiment of the present invention.

Referring to FIG. 6, a lower plate 40 of the second robot foot includes first through fourth pieces L11, L22, L33, and L44. The first piece L11 is the same as one that combines the right portion L1R of the first portion L1 and the right portion L2R of the second portion L2 of the lower plate 34 of FIG. 3 of the first robot foot and has the same function. That is, the first contact portion 34b is provided on a lower surface of the first piece L11. The first contact portion 34b of the first piece L11 may be made into a single body.

The second piece L22 is the same as one that combines the left portion L1L of the first portion L1 and the left proton L2L of the second portion L2 of the lower plate 34 of the first robot foot. The third contact portion 34d is provided on a lower surface of the second piece L22. The second piece L22 and the third contact portion 34d may be made into a single body.

The third piece L33 is the same as one that combines the center portions L1C and L2C of the first and second portions L1 and L2 of the lower plate 34 of the first robot foot and the third portion L3 of the lower plate 34.

The fourth piece L44 is the same as the fourth portion L4 of the lower plate 34 of the first robot foot. The second contact portion 34c is provided on a lower surface of the fourth piece L44. The fourth piece L44 and the second contact portion 34c may be made into a single body.

Figure 7:
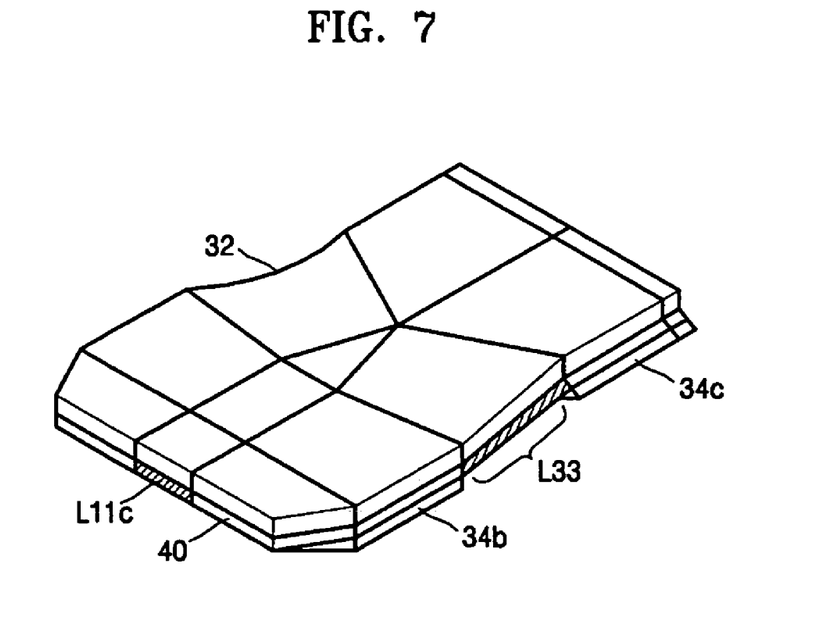
FIG. 7 is a perspective view of the foot of the robot shown in FIG. 6, in which an upper plate of FIG. 3 is installed on the lower plate shown in FIG. 6.

The first through fourth pieces L11, L22, L33, and L44 are independent pieces unlike the lower plate 34 of the first robot foot and are all attached to the upper plate 32. However, the entire shape is the same as the lower plate 34 of the first robot foot as shown in the drawings. Also, the first through fourth pieces L11, L22, L33, and L44 may be formed of rubber having different elasticity. For example, the first, second, and fourth pieces L11, L22, and L44 may be formed of a first thermoplastic rubber having a first elasticity while the third piece L33 may be formed of a second thermoplastic rubber having a second elasticity. Here, the first and second elasticity are different from each other. Also, the elasticity of the first and second pieces L11 and L22, the elasticity of the third piece L33, and the elasticity of the fourth piece L44 may be different from one another. FIG. 7 shows the second robot foot in which the upper plate 32 is attached on the lower plate 40, which comprises the first through fourth pieces L11, L22, L33, and L44.

For the robot having the second robot foot, a possibility of controlling viscous and elastic properties with respect to the robot foot is further increased. In particular, when the robot stands upright, the upper plate 32 of the second robot foot can be placed on a horizontal plane by appropriately matching the elastic modules of the first through fourth pieces L11, L22, L33, and L44. Also, a joint angle with respect to the second robot foot can be more accurately measured.

THIRD EMBODIMENT

Figure 8:
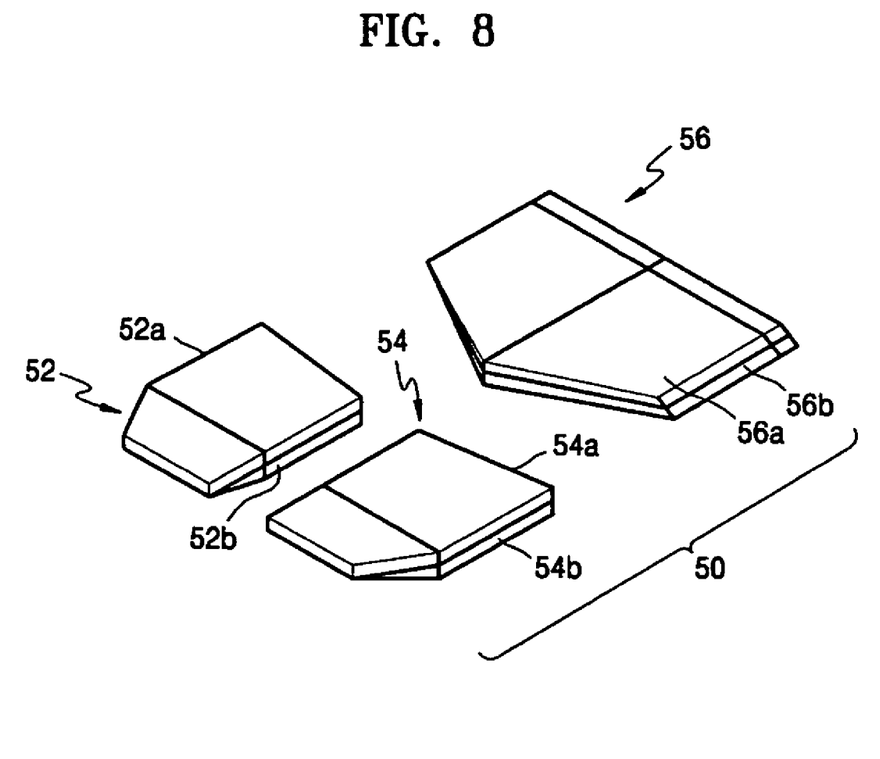
FIG. 8 is a perspective view of a lower plate of a foot of a robot according to a third embodiment of the present invention.

Referring to FIG. 8, a lower plate 50 attached to the upper plate 32 of a foot of a robot according to a third embodiment of the present invention (hereinafter, referred to as the third robot foot) includes fifth through seventh pieces 52, 54, and 56. The fifth through seventh pieces 52, 54, and 56 are separated from one another.

The fifth piece 52 corresponds to the first piece L11 of the lower plate 40 of the second robot foot shown in FIG. 6. The sixth piece 54 corresponds to the second piece L22 of the lower plate 40 of the second robot foot. The seventh piece 56 corresponds to the fourth piece L44 of the lower plate 40 of the second robot foot.

The fifth piece 52 includes a first attachment portion 52a and a first contact portion 52b which are sequentially deposited. The first attachment portion 52a is attached to a predetermined area of the upper plate 32 shown in FIG. 3 to which the second piece L22 is attached. The first contact portion 52b directly contacts the ground.

The sixth piece 54 includes a second attachment portion 54a and a second contact portion 54b which are sequentially deposited. The second attachment portion 54a is attached to a predetermined area of the upper plate 32 to which the first piece L11 is attached. The second contact portion 54b directly contacts the ground.

The seventh piece 56 includes a third attachment portion 56a and a third contact portion 56b, which are sequentially deposited. The third attachment portion 56a is attached to a predetermined area of the upper plate 32 to which the fourth piece L44 is attached. The third contact portion 56b directly contacts the ground.

Figure 9:
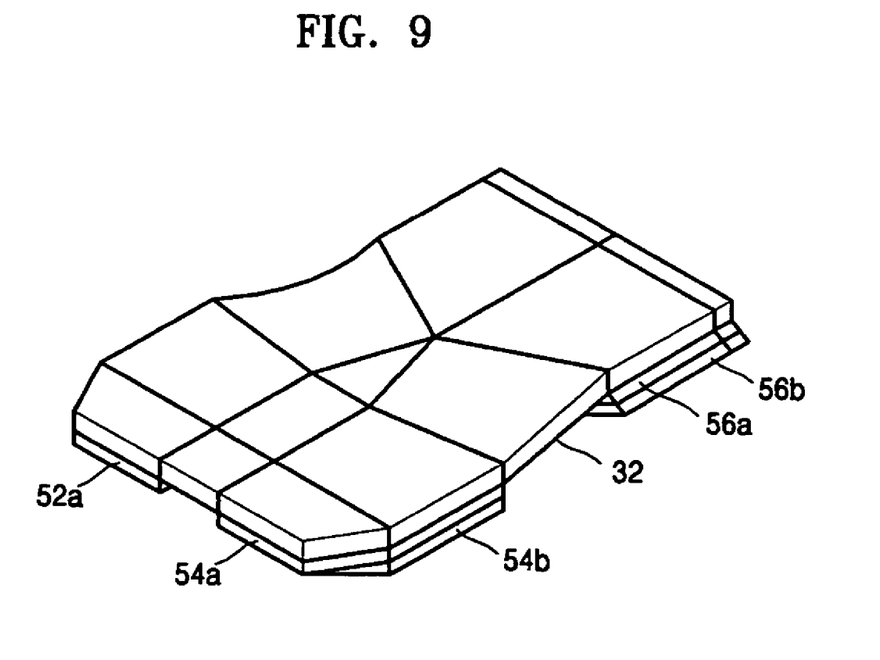
FIG. 9 is a perspective view of the foot of the robot shown in FIG. 8, in which an upper plate of FIG. 3 is installed on the lower plate shown in FIG. 8.

In the fifth through seventh pieces 52, 54, and 56, the first through third attachment portions 52a, 54a, and 56a are formed of rubber having a third elasticity, for example, thermoplastic rubber, and the first through third contact portions 52b, 54b, and 56b are formed of rubber having a fourth elasticity, for example, thermoplastic rubber. There may be no problem when the third and fourth elasticity are identical and each of the fifth through seventh pieces 52, 54, and 56 is a single body. Nevertheless, it is preferred that the third and fourth elasticity are different. The third robot foot including the lower plate 50 having the fifth through seventh pieces 52, 54, and 56 and the upper plate 32 attached on the lower plate 50 is shown in FIG. 9.

Like the robot having the second robot foot, for a robot having the third robot foot, a possibility of controlling viscous and elastic properties with respect to the robot foot is further increased. In particular, when the elasticity of the first through third attachment portions 52a, 54a, and 56a is less than that of the first through third contact portions 52b, 54b, and 56b, a vibration generated to the robot after the third robot foot steps on the ground is prevented. Also, since the stiffness of the lower plate 50 of the third robot foot is smaller than that of the entire third robot foot, an effect by a small obstacle existing under the lower plate 50 of the third robot foot on the third robot foot can be reduced.

FOURTH EMBODIMENT

Figure 10:
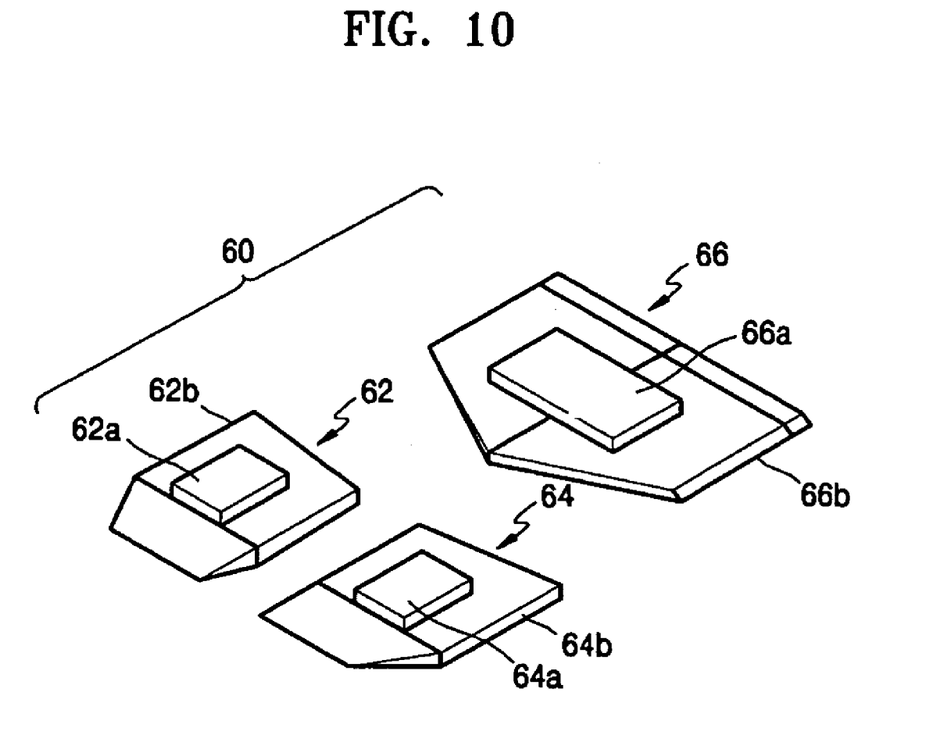
FIG. 10 is a perspective view of a lower plate of a foot of a robot according to a fourth embodiment of the present invention.

Referring to FIG. 10, a lower plate 60 of a foot of a robot according to a fourth embodiment of the present invention (hereinafter, referred to as the fourth robot foot) includes eighth through tenth pieces 62, 64, and 66, which are separated from one another. The eighth piece 62 includes a first attachment portion 62a and a first contact portion 62b which are sequentially deposited. The first attachment portion 62a attached to the lower surface of the upper plate 32 exists in a partial area of an upper surface of the first contact portion 62b that contacts the ground. The first contact portion 62b is equivalent to the third contact portion 34d of the lower plate 34 of the first robot foot 30 of FIG. 3 in its size or function. As the first attachment portion 62a exists only in the partial area of the first contact portion 62b, a contact surface between the first attachment portion 62a and the upper plate 32 is less than the contact area between the first attachment portion 52a of the fifth piece 52 and the upper plate 32 in the third embodiment.

Figure 11:
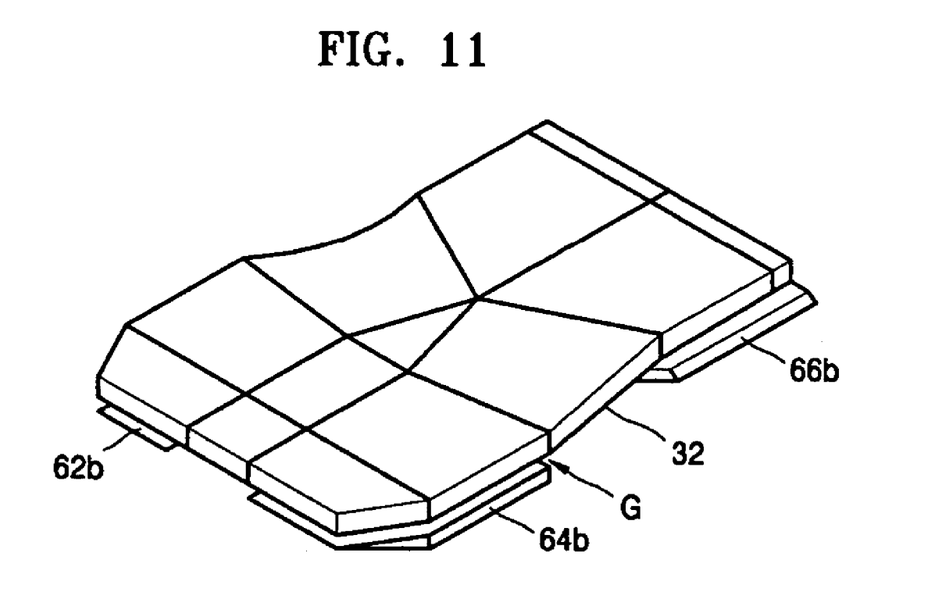
FIG. 11 is a perspective view of the foot of the robot shown in FIG. 10, in which an upper plate of FIG. 3 is installed on the lower plate shown in FIG. 10.

A step corresponding to a thickness of the first attachment portion 62a exists between the first attachment portion 62a and the first contact portion 62b around the first attachment portion 62a. A gap is formed, by the step, between the upper plate 32 around the first attachment portion 62a and the first contact portion 62b, as shown in FIG. 11. Such step and gap are formed in the ninth and tenth pieces 64 and 66 that will be described below. The first attachment portion 62a and the first contact portion 62b of the eighth piece 62 are formed of the same material but have different physical properties. For example, the first attachment portion 62a is a first rubber plate formed of thermoplastic rubber having a fifth elasticity and the first contact portion 62b is a second rubber plate formed of thermoplastic rubber having a sixth elasticity different from the fifth elasticity.

The ninth piece 64 includes a second attachment portion 64a attached to the lower surface of the upper plate 32 and a second contact portion 64b that contacts the ground together with the first contact portion 62b, which are sequentially deposited. The second attachment portion 64a exists in a partial area of an upper surface of the second contact portion 64b. Accordingly, the step and the gap are formed around the second attachment portion 64a like the first attachment portion 62a. The size, position, and function of the second contact portion 64b are identical to those of the first contact portion 34b of the lower plate 34 of the first robot foot 30. The second attachment portion 64a may be formed of a material having the same physical property as the first attachment portion 62a and the second contact portion 64b may be formed of a material having the same physical property as the first contact portion 62b.

The tenth piece 66 includes a third contact portion 66b that contacts the ground and a third attachment portion 66a provided in a partial area of the third contact portion 66b and attached to the lower surface of the upper plate 32. The step and the gap are formed around the third attachment portion 66a like the first and second attachment portions 62a and 64a. The size, position, and function of the third contact portion 66b are identical to those of the second contact portion 34c of the lower plate 34 of the first robot foot 30. The third attachment portion 66a may be formed of a material having the same physical property as the first attachment portion 62a and the third contact portion 66b may be formed of a material having the same physical property as the first contact portion 62b.

FIG. 11 shows a fourth robot foot where the lower plate 60 shown in FIG. 10 and the upper plate 32 are sequentially deposited. Referring to FIG. 11, it can be seen that a gap G is present between the upper plate 32 and the first through third contact portions 62b, 64b, and 66b. For a robot having the fourth robot foot, since the gap G is present between the upper plate 32 and the lower plate 60 due to the step, rotational stiffness relative to the pitch and roll axes of the fourth robot foot can be reduced compared to the first through third robot foots. Thus, the lower plate 60 of the fourth robot foot can provide for small angular deformations around the pitch and roll axes. Accordingly, when the fourth robot foot steps on the ground, the heel of the fourth robot foot can smoothly contact the ground and an effect by a small obstacle or an uneven surface can be reduced.

<Exemplary Experiment>

The present inventor manufactured an anthropomorphic robot having the second robot foot embodiment, two legs, and a waist. The anthropomorphic robot is 80% of an actual size. A six-axis sensor to measure a response force to the ground and torque in a stand or moving state is installed on the foot of the anthropomorphic robot. Six actuators are installed at each leg. In this state, a period, during which the robot moves the left foot from a stop state and then moves the right foot to a position where the left foot is located, that is, the heel of the right foot steps on the ground, is referred to as one step made by the robot.

Figure 12:
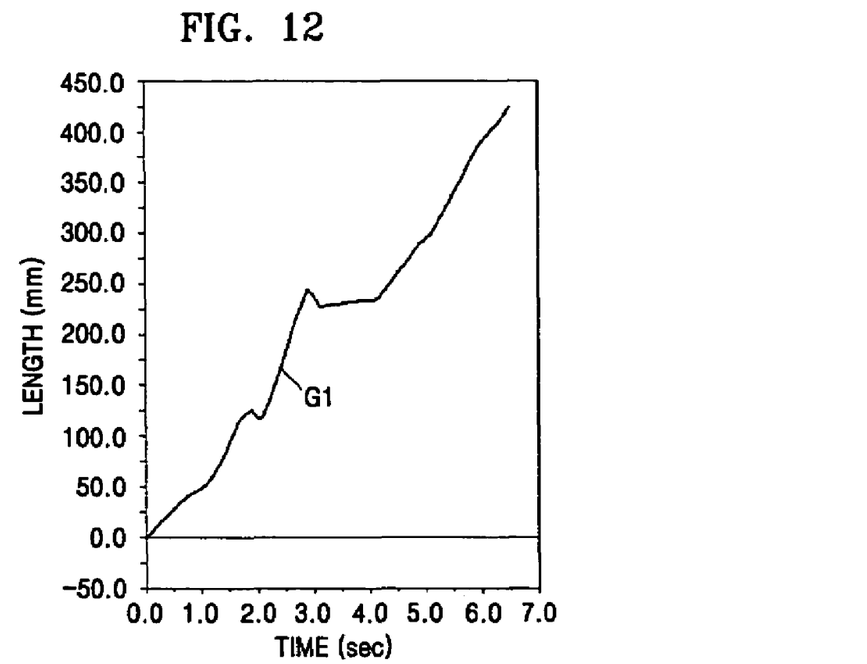
FIGS. 12 and 13 are graphs showing a trace of a zero moment point where moment of the anthropomorphic robot becomes zero, which is measured during the movement of the anthropomorphic robot shown in FIG. 1 by one step.
Figure 13:
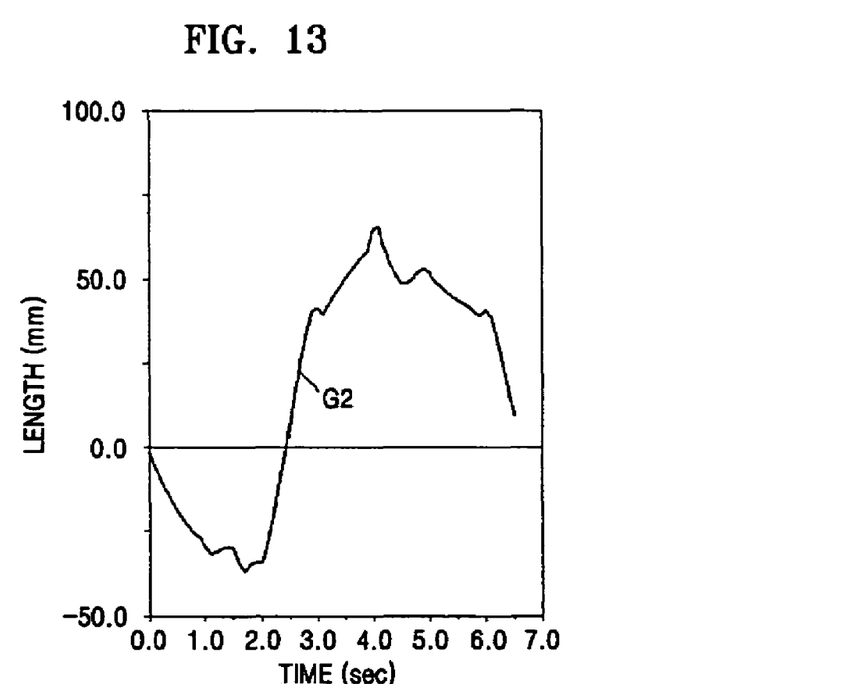

FIGS. 12 and 13 show a trace of a zero moment point (ZMP) where moment of the anthropomorphic robot becomes zero, which is measured, during which the anthropomorphic robot shown in FIG. 1 moves one step.

The overall stability of a bipedal robot is determined by the ZMP. A first graph G1 of FIG. 12 shows a change in a Z-axis direction of the ZMP, that is, in a direction in which the anthropomorphic robot moves forward, for 6.5 seconds when the anthropomorphic robot moves one step. A second graph G2 of FIG. 13 shows a change along an X-axis of the ZMP for the above time. The coordinates $(X_{zmp}, Z_{zmp})$ of the ZMP on an X-Z plane are given by Equations 4 and 5.

$$x_{zmp} \cong \frac{\sum_{e=1}^{n}[m_e x_e (\ddot{y}_e + g) - m_e y_e \ddot{x}_e]}{\sum_{e=1}^{n} m_e (\ddot{y}_e + g)}$$ [Equation 4]

$$z_{zmp} \cong \frac{\sum_{e=1}^{n}[m_e z_e (\ddot{y}_e + g) - m_e y_e \ddot{z}_e]}{\sum_{e=1}^{n} m_e (\ddot{y}_e + g)}$$ [Equation 5]

In Equations 4 and 5, $m_e$ denotes mass when e=1, 2, ..., n. $(x_e, y_e, z_e)$ denotes a coordinate of the center of mass when e=1, 2, ..., n. $(\ddot{x}_e, \ddot{y}_e, \ddot{z}_e)$ denotes acceleration of the center of mass when e=1, 2, ..., n. Referring to the first graph G1 of FIG. 12, it can be seen that the total displacement of the ZMP in the Z-axis direction is about 425 mm. Referring to the second graph G2 of FIG. 13, it can be seen that the maximum declination in the X-axis direction is about 65 mm when the anthropomorphic robot moves one step. To maintain a stable state when the anthropomorphic robot walks, the ZMP must be within a stable area defined by the size of the foot of the anthropomorphic robot.

Figure 14:
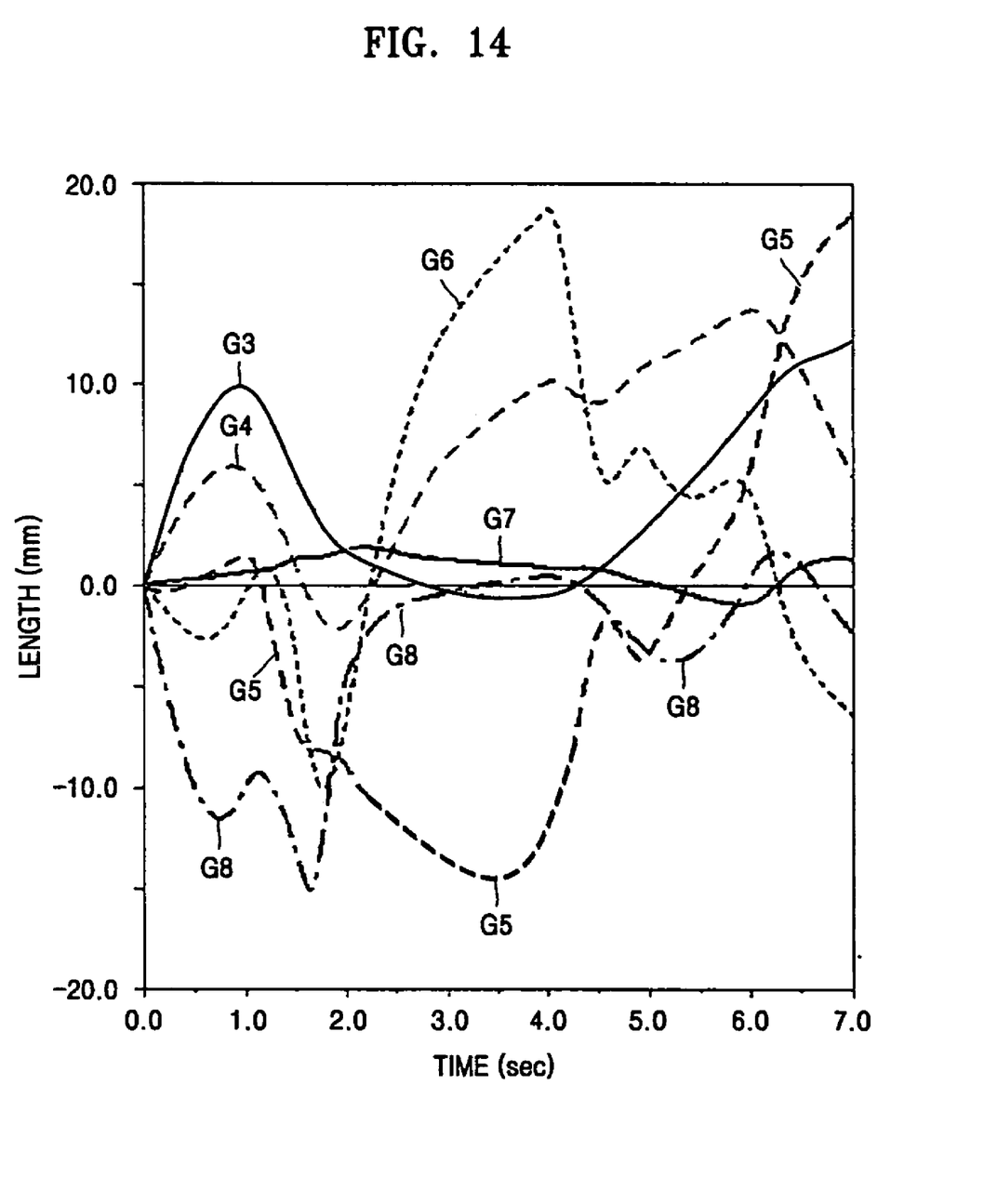
FIG. 14 is a graph showing changes in motion of six actuators installed at the left leg of the anthropomorphic robot shown in FIG. 1 during one step.

FIG. 14 showing changes in motion of the six actuators installed at the left leg of the anthropomorphic robot when the anthropomorphic robot moves one step. In FIG. 14, third and fourth graphs G3 and G4 show changes of motion of the actuators provided at the left and right sides of the left leg of the robot to rotate an ankle joint around the roll axis and a pitch axis, respectively. Fifth and sixth graphs G5 and G6 show changes in motion of the actuators provided at the left and right sides of the left leg of the robot to rotate a waist joint around the roll axis and the pitch axis, respectively. A seventh graph G7 shows a change in motion of the actuator provided at the left leg of the robot to rotate the waist joint around a yaw axis. An eighth graph G8 shows a change in motion of a center actuator provided at the left leg of the robot to rotate a knee joint around the pitch axis.

Figure 15:
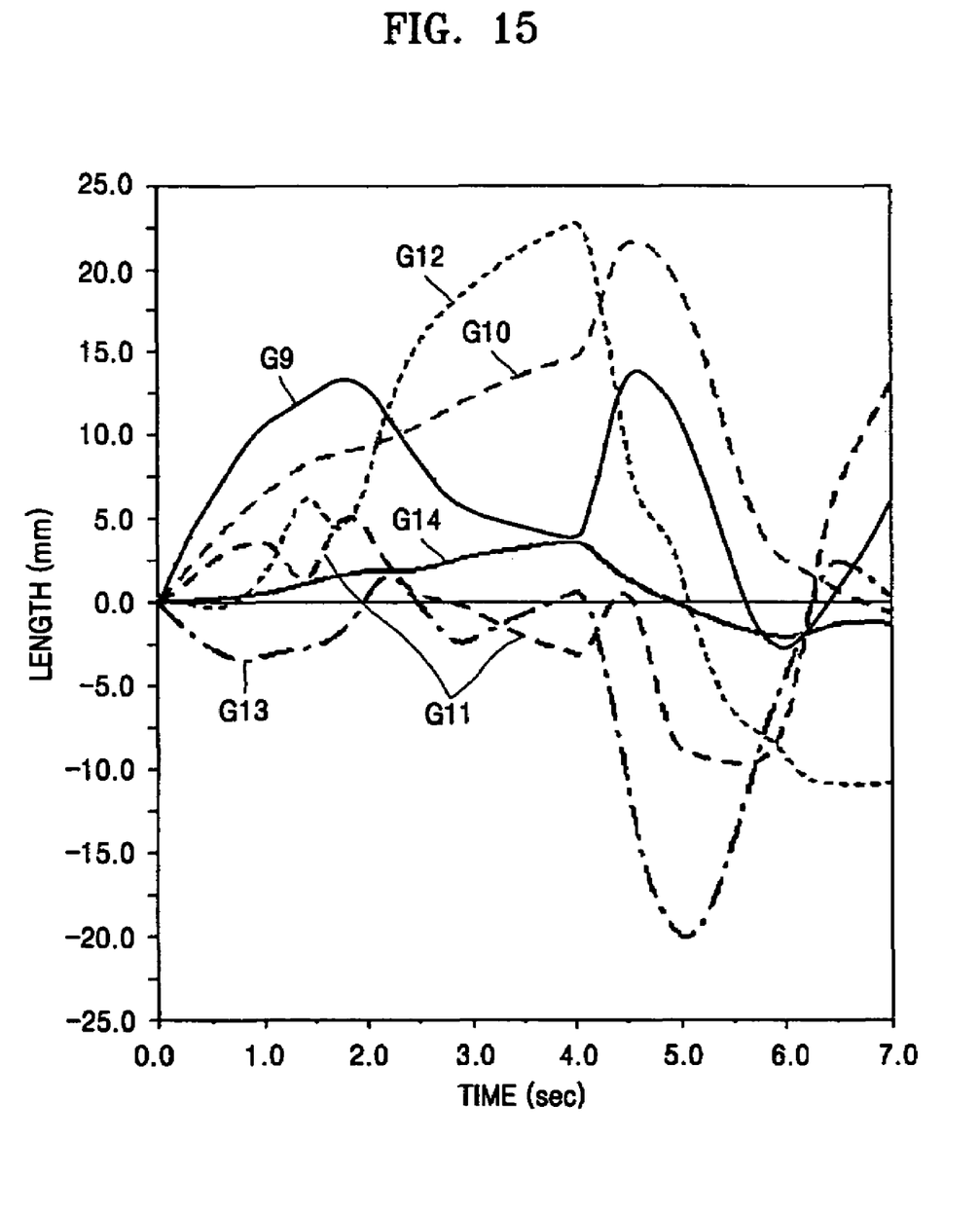
FIG. 15 is a graph showing changes in motion of six actuators installed at the right leg of the anthropomorphic robot shown in FIG. 1 during one step.

FIG. 15 shows changes in motion of the six actuators installed at the right leg of the anthropomorphic robot when the anthropomorphic robot moves one step. In FIG. 15, ninth and tenth graphs G9 and G10 show changes of motion of the actuators provided at the left and right sides of the right leg of the robot to rotate the ankle joint around the roll axis and the pitch axis, respectively. Eleventh and twelfth graphs G11 and G12 show changes in motion of the actuators provided at the left and right sides of the right leg of the robot to rotate the waist joint around the roll axis and the pitch axis, respectively. A thirteenth eighth graph G13 shows a change in motion of the center actuator provided at the right leg of the robot to rotate the knee joint around the pitch axis. A fourteenth graph G14 shows a change in motion of the actuator provided at the right leg of the robot to rotate the waist joint around the yaw axis.

Figure 16:
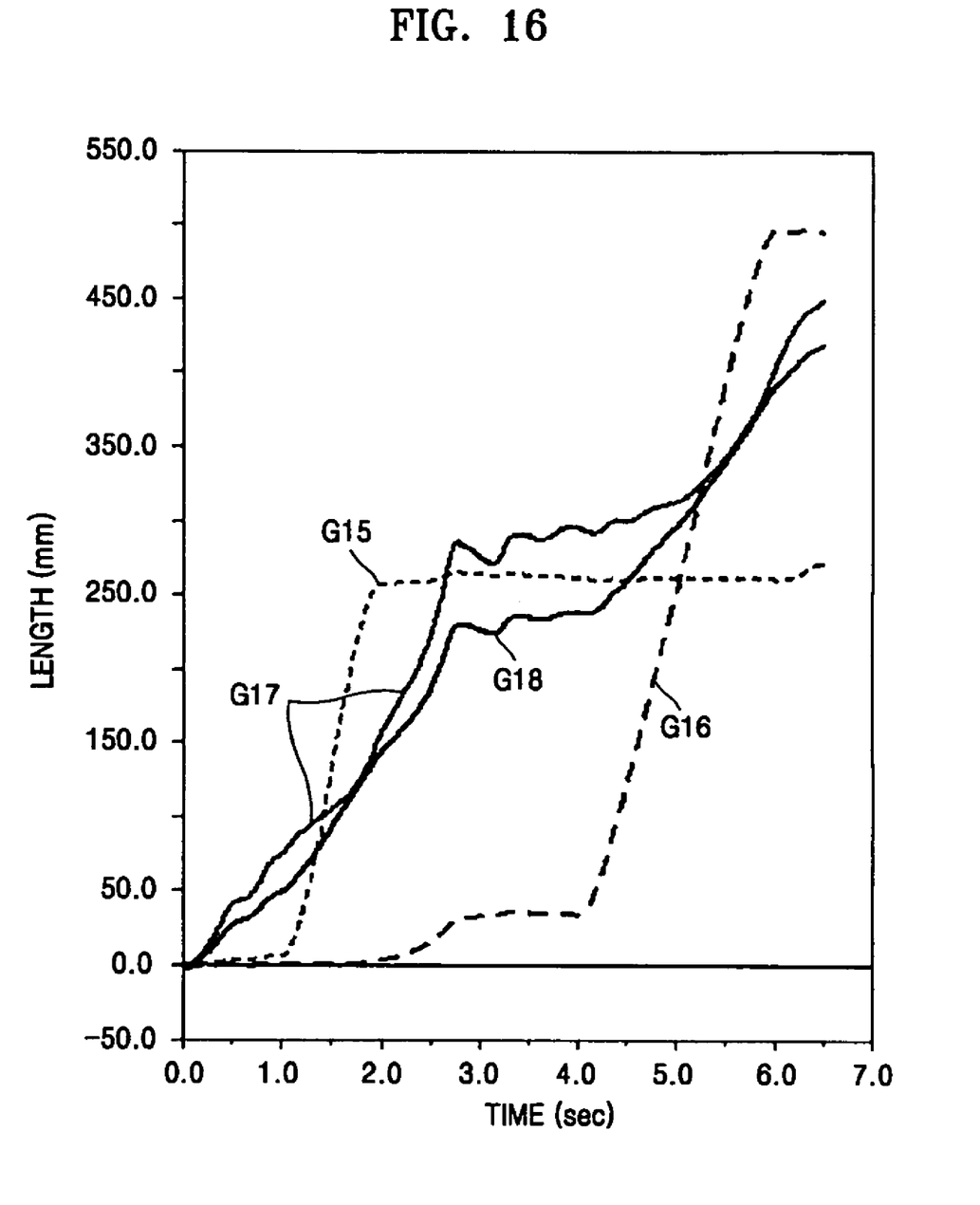
FIG. 16 is a graph showing changes in trajectories of the centers of mass of the left and right foots of the anthropomorphic robot shown in FIG. 1, the center of mass of the waist of the robot, and the center of mass of the robot in a direction (Z axis) in which the robot advances, when the robot moves one step forward.

FIG. 16 shows changes in trajectories of the centers of mass of the left and right foots of the anthropomorphic robot, the center of mass of the waist of the robot, and the center of mass of the robot in the Z-axis direction in which the robot advances, when the robot moves one step forward. In FIG. 16, a fifteenth graph G15 shows a change in trajectory of the center of mass of the left foot of the robot. A sixteenth graph G16 shows a change in trajectory of the center of mass of the right foot of the robot. A seventeenth graph G17 shows a change in trajectory of the center of mass of the waist of the robot. An eighteenth graph G18 shows a change in trajectory of the center of mass of the robot.

Figure 17:
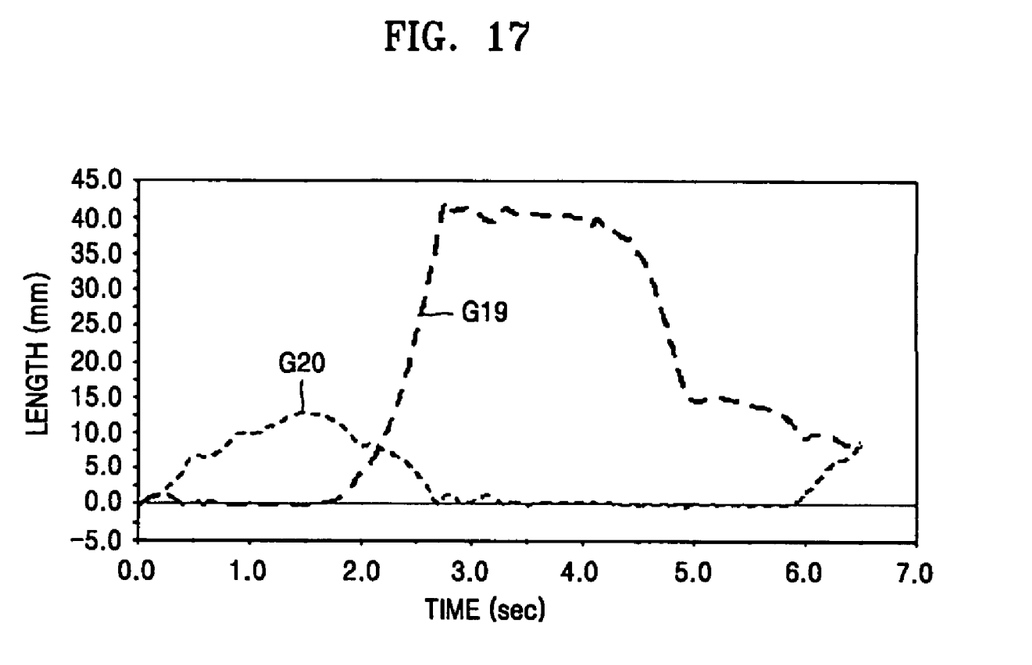
FIG. 17 is a graph showing changes in trajectories of the centers of mass of the left and right foots of the anthropomorphic robot shown in FIG. 1 in a direction perpendicular to the ground, that is, in a direction (Y axis) perpendicular to a Z-X plane, when the robot moves one step forward.

FIG. 17 shows changes in trajectories of the centers of mass of the left and right foots of the anthropomorphic robot in a direction perpendicular to the ground, that is, in the Y-axis direction perpendicular to a Z-X plane, when the robot moves one step forward. In FIG. 17, a nineteenth graph G19 shows a change in trajectory of the center of mass of the right foot of the robot. A twentieth graph G20 shows a change in trajectory of the center of mass of the left foot of the robot.

Figure 18:
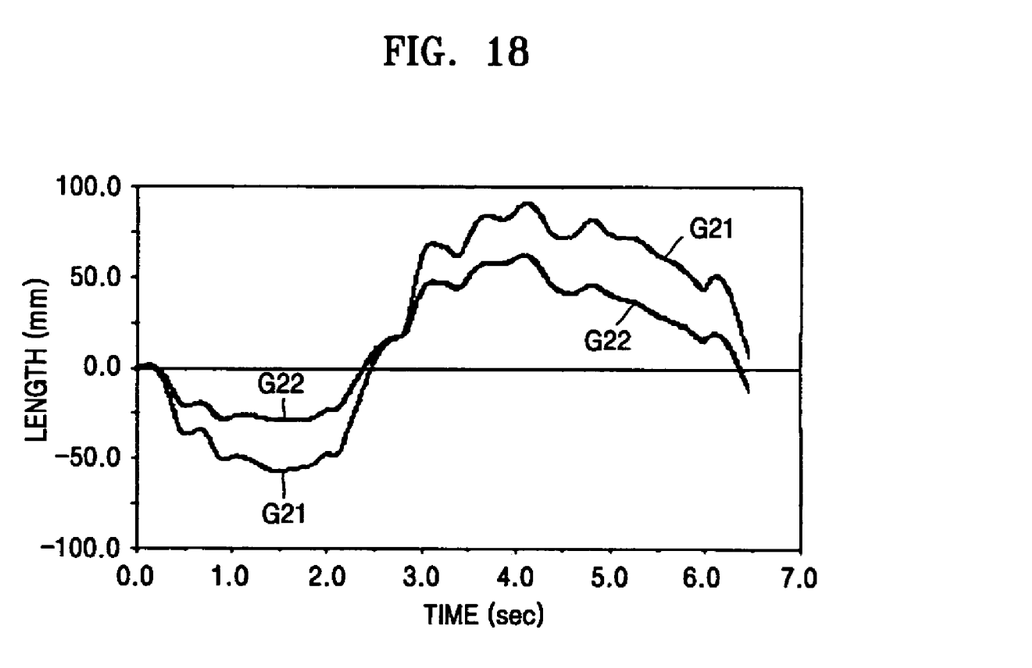
FIG. 18 is a graph showing changes in trajectories of the center of mass of the waist of the anthropomorphic robot shown in FIG. 1 and the center of mass of the robot along an X axis, to show how much the robot moves left and right while moving one step forward.

FIG. 18 shows changes in trajectories of the center of mass of the waist of the anthropomorphic robot and the center of mass of the robot along the X-axis, to show how much the robot moves left and right while moving one step forward. Here, when the center of mass of the waist and the center of mass of the robot moves to the left when viewed from the front side of the robot, a value of movement of each center of mass becomes negative, and the value becomes positive when the respective centers of mass move to the right.

In FIG. 18, a twenty-first graph G21 concerns the center of mass of the waist of the robot while a twenty-second graph G22 concerns the center of mass of the whole robot. Referring to the twenty-first graph G21 and the twenty-second graph G22, it can be seen that, while the robot moves one step forward, the center of mass of the waist of the robot moves further to the left and right than the center of mass of the whole robot. The result signifies that, when the robot walks, the movement of the center of mass of the robot to the left and right is not great, that is, walking of the robot becomes more stable.

Figure 19:
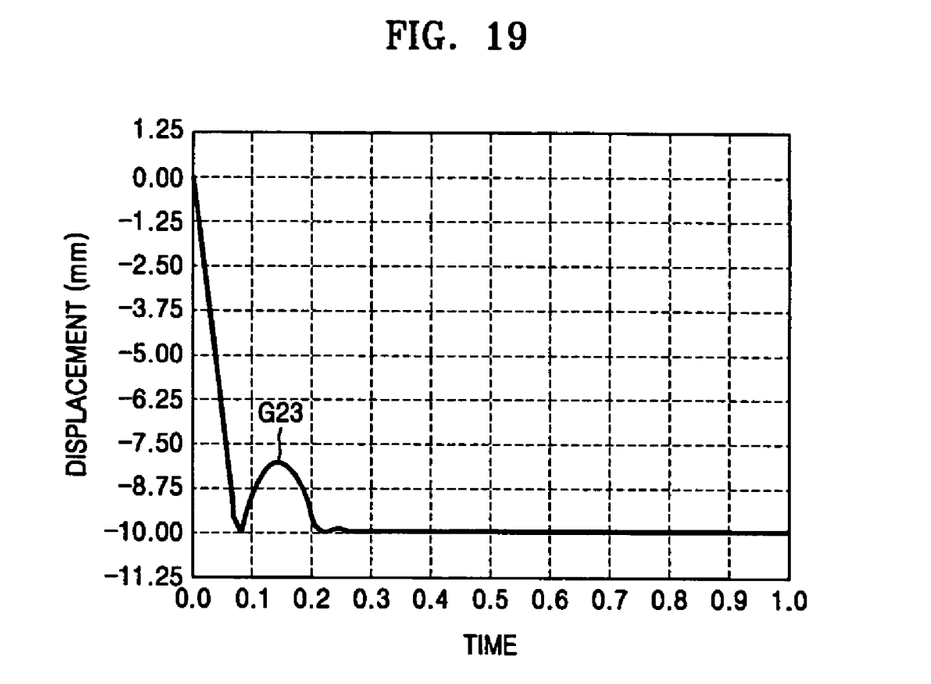
FIG. 19 is a graph showing a vertical displacement of the center of mass of the left foot of the anthropomorphic robot shown in FIG. 1 along the Y axis when the robot located at a position a predetermined height above the ground, for example, 10 mm high from the ground, steps down to the ground.

A twenty-third graph G23 of FIG. 19 shows a vertical displacement of the center of mass of the left foot of the anthropomorphic robot along the Y-axis when the robot located at a position of a predetermined height above the ground, for example, 10 mm high from the ground, steps down to the ground. Since the original position of the robot is 10 mm high from the ground, the zero (0) point of the Y-axis is moved 10 mm upward.

Referring to the twenty-third graph G23, after 0.2 seconds passes after the left foot of the robot steps from the 10 mm high position down to the ground, a movement of the left foot of the robot in the vertical direction, that is, in the Y-axis direction, does not appear. This means that, after stepping on the ground, the left foot of the robot reaches static equilibrium for a short time of 0.2 seconds.

Figure 20:
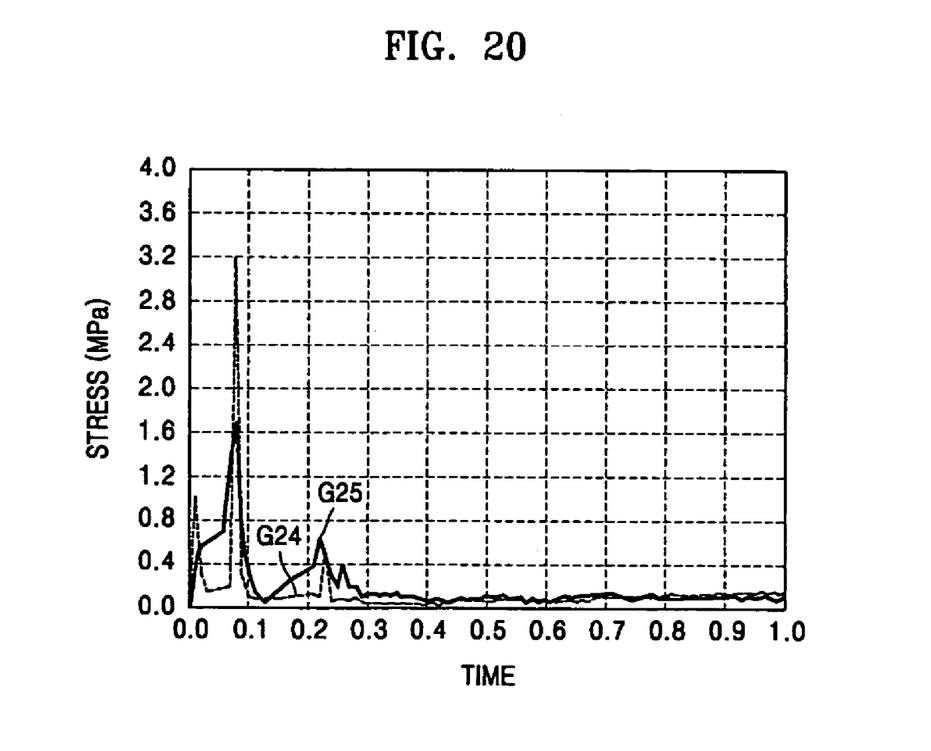
FIG. 20 is a graph showing stress applied to the foot of the anthropomorphic robot shown in FIG. 1 that has the lower plate of the foot of the robot shown in FIG. 6 while the robot walks.

FIG. 20 shows stress applied to a portion corresponding to the heel and toes of the foot of the anthropomorphic robot, that is, the fourth piece L44 and the first ad second pieces L11 and L22 of the lower plate 40, while the robot walks, when the lower plate of the foot of the robot is the lower plate 40 of the second robot foot shown in FIG. 6. The stress shown in FIG. 20 is measured when the robot move one step. The stress applied to the fourth piece L44 and the first and second pieces L11 and L22 of the lower plate 40 is a barometer to determine a shock force delivered from the ground while the robot walks and the stability of the robot with respect to the shock force.

In FIG. 20, a twenty-fourth graph G24 shows a change in stress applied to the first and second pieces L11 and L22 of the lower plate 40 of the robot foot when the robot move one step. A twenty-fifth graph G25 shows a change in stress applied to the heel of the robot foot, that is, the fourth piece L44 of the lower plate 40.

Although the twenty-fourth graph G24 shows the change in stress applied to the two areas of the lower plate 40, that is, the first and second pieces L11 and L22, the result appears to be one obtained from the change in stress applied to a single area because the first and second pieces L11 and L22 of the lower plate 40 have a geometrically almost perfect symmetrical shape. That is, since the stress applied to the first piece L11 of the lower plate 40 is the same as that applied to the second piece L22, the graphs showing the changes in stress with respect to the first and second pieces L11 and L22 are identical.

Referring to the twenty-fourth and twenty-fifth graphs G24 and G25, it can be seen that the vibration due to a shock force generated when the foot of the robot steps on the ground almost disappears after 0.3 seconds after the robot foot steps on the ground. Although a lot of matters are described in the above, they are not limiting the scope of the rights of the invention but must be interpreted as exemplary embodiments. For example, one skilled in the art to which the present invention pertains can form more number of holes, through which members contacting the upper plate are exposed, in the members contacting the ground among those constituting the lower plate of the foot of the robot within a scope not damaging the stability of walling of the robot. For example, holes through which the rubber plate 34a attached to the lower surface of the upper plate 32 can be formed in the first through third contact portions 34b, 34c, and 34d shown in FIG. 4. Thus, while this invention has been particularly shown and described with reference to preferred embodiments thereof, it will be understood by those skilled in the art that various changes in form and details may be made therein without departing from the spirit and scope of the invention as defined by the appended claims.

As described above, according to the present invention, portions provided at the lower plate of the robot that contacts the ground are disposed at the separated positions. Thus, by using the robot foot, an effect by a small obstacle and an uneven surface existing on the ground on the robot can be reduced. As a result, a robot control system is simplified and walking of the robot can be more stabilized.

Also, the robot foot according to the present invention has a shock absorbing member having a predetermined elasticity or a shock absorbing member formed of members having different elasticity, which is provided at the lower plate. Accordingly, when the robot moves, a shock delivered from the ground is absorbed and the shock is prevented from being transferred to the body of the robot. Furthermore, the vibration transferred after the robot foot steps on the ground can be reduced. Therefore, the dynamic equilibrium of the robot is obtained so that walking of the robot becomes stable and smooth.

What is claimed is:

1. An anthropomorphic robot having two legs and being capable of walking upright, wherein each leg has a foot which comprises:
   an upper plate on which an ankle joint is installed and which is similar in shape to a foot of a human so that a front portion is wider than a rear portion; and
   a lower plate attached to a lower surface of the upper plate and comprising:
      a single elastic plate whose entire upper surface contacts the lower surface of the upper plate; and
      first through third elastic ground contact portions separate from the single elastic plate and separate from one another; respective upper surfaces of all of the ground contact portions being directly attached to a lower surface of the single elastic plate and protruding downwardly therefrom; the first through third ground contact portions being spaced from one another.

2. The anthropomorphic robot as claimed in claim 1, wherein the upper plate is a metal plate having a stiffness property.

3. The anthropomorphic robot as claimed in claim 1, wherein the first through third ground contact portions have different respective elasticities.

4. An anthropomorphic robot having two legs and being capable of walking upright, wherein each leg has a foot which comprises:
   an upper plate on which an ankle joint is installed and which is similar in shape to a foot of a human; and
   a lower plate attached to a lower surface of the upper plate and having a plurality of contact portions which contact a ground and which are separated from one another, wherein the lower plate comprises an elastic plate having a first elasticity and whose entire upper surface contacts the lower surface of the upper plate; and first through third contact portions having a second elasticity and protruding from a lower surface of the elastic plate to contact the ground, wherein the first and second elasticity are identical to each other.

5. The anthropomorphic robot as claimed in claim 1, wherein the elasticity of the single elastic plate is different from elasticities of the first throuah third ground contact portions.

6. An anthropomorphic robot having two legs and being capable of walking upright, wherein each leg has a foot which comprises:

an upper plate on which an ankle joint is installed and which is similar in shape to a foot of a human; and a lower plate attached to a lower surface of the upper plate and having a plurality of contact portions which contact a ground and which are separated from one another, wherein the lower plate comprises an elastic plate having a first elasticity and whose entire upper surface contacts the lower surface of the upper plate; and first through third contact portions having a second elasticity and protruding from a lower surface of the elastic plate to contact the ground, wherein the elastic plate and the first through third contact portions are a single body.

7. An anthropomorphic robot having two legs and being capable of walking upright, wherein each leg has a foot which comprises:

an upper plate on which an ankle joint is installed and which is similar in shape to a foot of a human; and a lower plate attached to a lower surface of the upper plate and having a plurality of contact portions which contact a ground and which are separated from one another, wherein the lower plate comprises an elastic plate having a first elasticity and whose entire upper surface contacts the lower surface of the upper plate; and first through third contact portions having a second elasticity and protruding from a lower surface of the elastic plate to contact the ground, wherein the elastic plate is formed of a plurality of independent bodies comprising:.

a first piece having a lower surface to which the first contact portion is attached;

a second piece having a lower surface to which the second contact portion is attached;

a fourth piece having a lower surface to which the third contact portion is attached; and a third piece provided between the first, second and fourth pieces.

8. The anthropomorphic robot as claimed in claim 7, wherein the elasticity of some of the independent bodies is different from the remaining bodies.

9. The anthropomorphic robot as claimed in claim 7, wherein the first contact portion and the first piece, the second contact portion and the second piece, and the third contact portion and the fourth piece are all single bodies.

10. The anthropomorphic robot as claimed in claim 7, wherein the elasticity of the first, second, and fourth pieces is different from that of the third piece.

11. The anthropomorphic robot as claimed in claim 3, wherein the elastic plate is a thermoplastic rubber plate.

12. The anthropomorphic robot as claimed in claim 7, wherein the elastic plate is a thermoplastic rubber plate.

13. The anthropomorphic robot as claimed in claim 1, wherein the upper plate is a non metal plate stiffer than the lower plate.

* * * * *